No. 718,705. PATENTED JAN. 20, 1903.
C. T. ELLISTON.
WHEEL PLOW.
APPLICATION FILED JUNE 28, 1902.
NO MODEL. 2 SHEETS—SHEET 1.
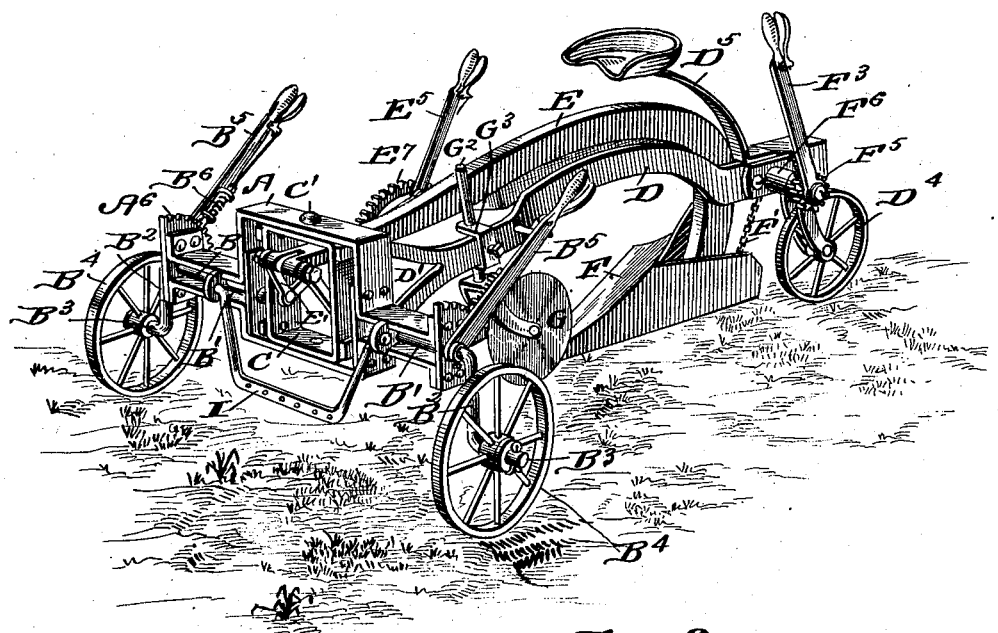
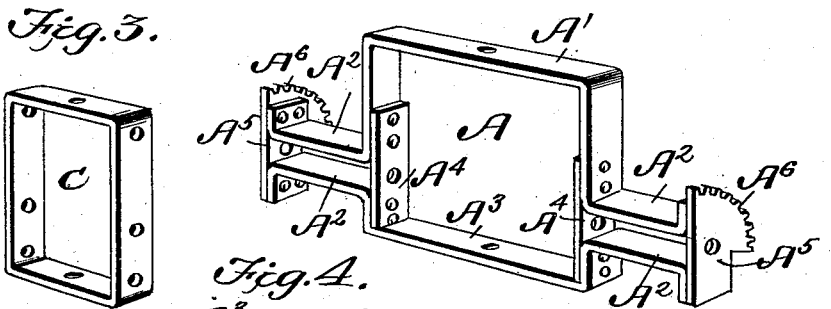
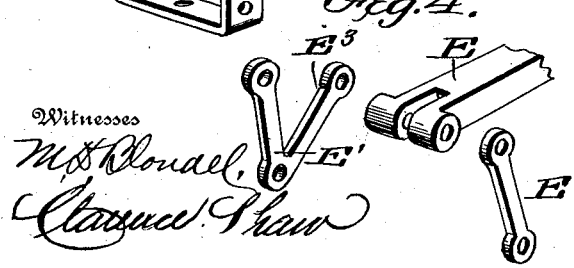

No. 718,705. PATENTED JAN. 20, 1903.
C. T. ELLISTON.
WHEEL PLOW.
APPLICATION FILED JUNE 28, 1902.
NO MODEL. 2 SHEETS—SHEET 2.
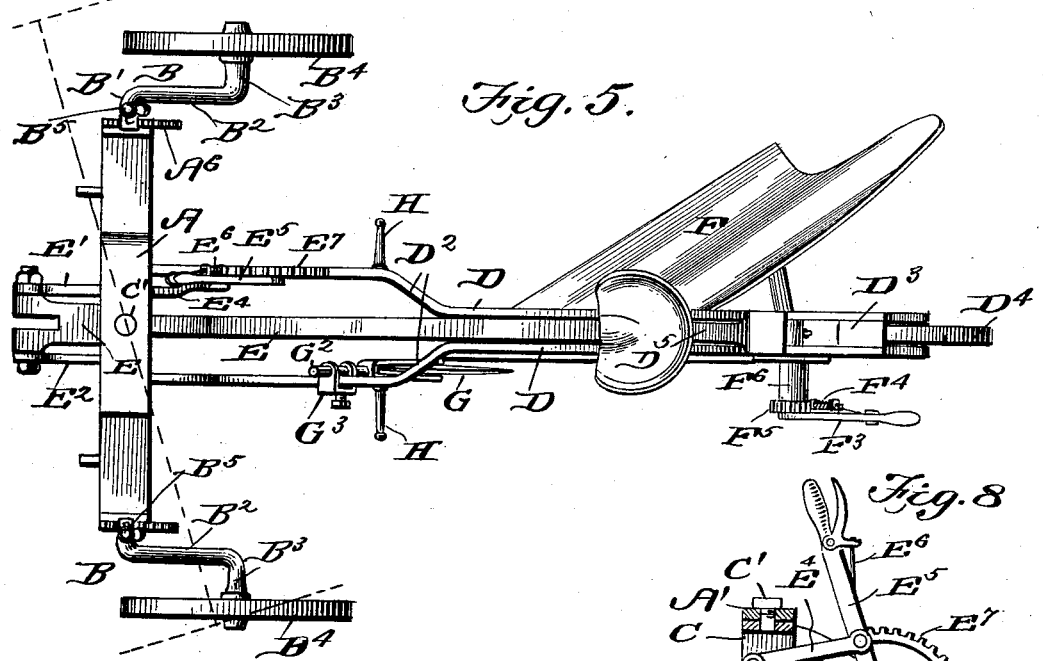
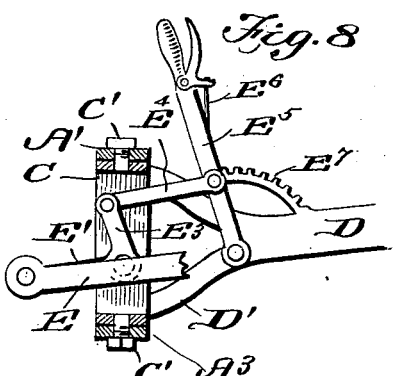
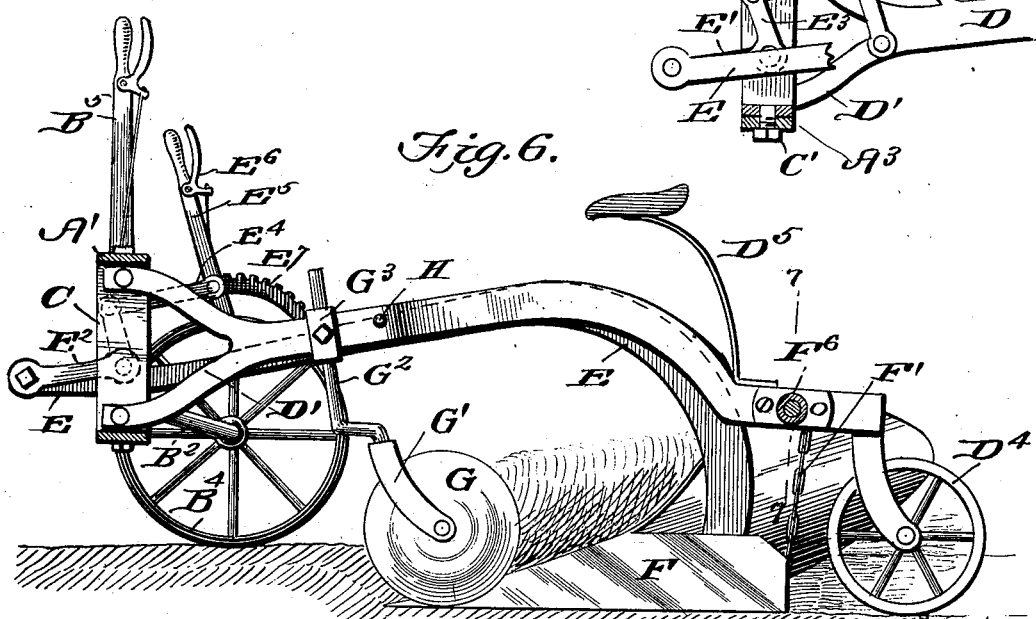
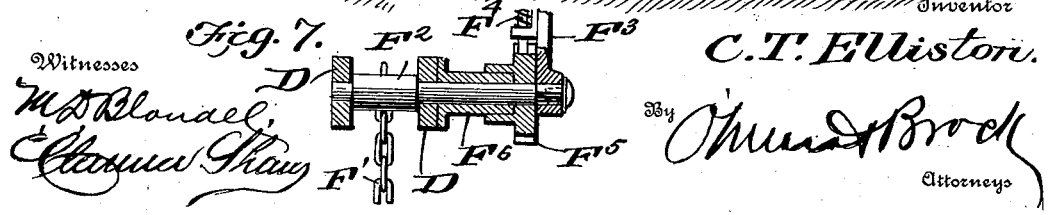

UNITED STATES PATENT OFFICE.

CHARLES T. ELLISTON, OF CLINTON, MISSOURI.

WHEEL-PLOW.

SPECIFICATION forming part of Letters Patent No. 718,705, dated January 20, 1903.

Application filed June 28, 1902. Serial No. 113,588. (No model.)

*To all whom it may concern:*

Be it known that I, CHARLES T. ELLISTON, a citizen of the United States, residing at Clinton, in the county of Henry and State of Missouri, have invented a new and useful Wheel-Plow, of which the following is a specification.

This invention relates generally to plows, and more particularly to that class thereof known as "wheel-plows."

The object of the invention is to provide a plow of this class which can be quickly and easily regulated to any depth desired, one which is attached to a beam which is pivoted at its forward end, and one in which the entire weight of the plow is suspended by means of an adjustable chain or cable connected to the rear portion of the frame members.

Another object of the invention is to provide a skeleton frame, to which the frame members are connected; and another object is to provide a pivot-frame within the skeleton frame and to which the plow-beam is pivotally connected, the said arrangement of skeleton and pivot frame permitting the plow to make very short turns.

Another object is to provide a skeleton frame with adjustable axles carrying the ground-wheels and by means of which the frame or carriage can be adjusted to travel in a level position upon any and all conditions of ground.

Another object of the invention is to provide an adjustable colter carried by the plow-frame in advance of the plow and entirely independent thereof.

With these objects in view and certain others, as will appear hereinafter, the invention consists in the various features of construction, combination, and arrangement, all of which will be fully set forth in the description and specified in the appended claims.

In the drawings forming part of this specification, Figure 1 is a perspective view of a wheel-plow constructed in accordance with my invention, the plow being shown in its raised or elevated position. Fig. 2 is a detail perspective view of the skeleton frame. Fig. 3 is a view of the pivoted frame. Fig. 4 is a detail perspective view showing the manner of connecting the forward end of the plow-beams to the pivoted frame. Fig. 5 is a top plan view, the plow being shown in its lowered or working position. Fig. 6 is a longitudinal sectional view showing the plow in its lowered or working position. Fig. 7 is a detail sectional view on the line 7 7 of Fig. 6. Fig. 8 is a detail sectional view illustrating the manner of adjusting the forward end of the plow-standard.

In the construction of a plow in accordance with my invention I provide a skeleton frame A, which is composed of an upper arched section A', having lateral extensions $A^2$, and the lower drop-section $A^3$, also having lateral extensions $A^2$, the upper and lower sections of the frame being united by means of the perforated plates $A^4$, and the outer ends of the lateral extensions $A^2$ are connected to the plates $A^5$, the rear upper edges of said plates $A^5$ being curved in the arc of a circle and provided with rack-teeth $A^6$. The axles B are pivotally connected to the skeleton frame, the horizontal portions B' being journaled in the perforated plates $A^4$ and $A^5$, said axles being carried downwardly, as shown at $B^2$, said depending portions terminating in short sections $B^3$, upon which the ground-wheels $B^4$ are mounted. Hand-levers $B^5$ are rigidly connected to the upper sections B' adjacent to the plates $A^5$, said hand-levers being provided with spring-latches $B^6$, which are adapted to engage the rack-segments $A^6$. By means of this construction the skeleton frame can be raised or lowered as desired by raising and lowering the hand-levers, and inasmuch as the axles are independent of each other it is obvious that one wheel can be raised and the opposite wheel lowered, if so desired, thereby accommodating all conditions of ground, and thus enabling the plow to be moved in a level position for hillsides or steep grades.

An essentially rectangular frame C is pivotally mounted within the skeleton frame A, between the upper and lower sections thereof, said frame C being pivoted by means of bolts or rivets C', passing through the upper and lower members of the said frame C and also through the upper and lower members of the skeleton frame A. The plow-frame D is rigidly connected at its forward end to the exterior of the side members of the frame C. The plow-frame D is preferably bifurcated at its forward end, as shown at D', and at $D^2$, the frame members are bent closer toward each other and beyond that point are continued in parallel relation and at their rear ends are united by means of a coupling-block D³, in which is journaled the shank of the bracket carrying the caster-wheel D⁴. The seat-bar D⁵ is also rigidly connected to the rear ends of the members of the frame D and projects forwardly in order to support the seat in the proper position. The plow-beam E is arranged between the members of the frame D, the forward end of the beam projecting through the pivoted frame C, and the said forward end is pivotally connected to the sides of said frame through the medium of links E' and E², the link E' having a lever E³ extending at right angles therefrom and to which is connected a rod E⁴, which in turn is pivotally connected to the hand-lever E⁵, provided with a spring-latch E⁶, adapted to engage a toothed segment E⁷, mounted upon one member of the plow-frame, and it will also be noted that the hand-lever E⁵ is pivoted to one of the said frame members. The link E' is pivoted direct to the frame C, the links E' E² being shown in dotted lines in Fig. 6. The construction of the links is shown in Fig. 4, and the connection of the link E' to E³ is shown in Fig. 8. By means of the hand-lever and the link connections the forward end of the plow-beam can be raised or lowered as desired, and this movement, it will be noted, is entirely independent of the adjustment of the skeleton frame. The plow-beam extends rearwardly between the plow-frame members and is curved downwardly, as shown, at its lower and rear end has the plow F connected thereto, said plow being of the usual or any approved construction. A supporting-chain F' is connected to the plow, preferably at the rear end of the landside, the upper end of said chain being connected to a winding-shaft F², journaled in the plow-frame D, and having an operating-lever F³ rigidly connected to one end thereof, and this lever F³ is provided with a spring-latch F⁴, which is adapted to engage the rack-segment F⁵, carried by a sleeve F⁶, projecting from one side of one of the plow-frame members and through which the extended end of the shaft F² passes. By operating the hand-lever F³ the shaft is moved to wind or unwind the chain F', thereby raising or lowering the plow, and it will be noted that inasmuch as the plow is rigid with the beam and the said beam pivoted only at its forward end a slight movement of the hand-lever will produce a considerable adjustment in the plow. Furthermore, by supporting the plow in the manner set forth it is maintained in a thoroughly level position and the entire force of the draft is exerted upon the frame. A rolling colter G is carried by a bracket G', having a shank G², adjustably connected to the plow-frame D by a clip G³. This colter can be adjusted to cut into the earth to any desired depth and travels directly in advance of the plow and adjacent thereto, and it will also be noted that the plow and colter are absolutely independent of each other, and each one can therefore be adjusted or moved independent of the other. Suitable foot-rests H are attached to the plow-frame D and project laterally therefrom. A draft-bail I is pivotally connected to ears carried by the lateral extensions A². By having the plow-frame connected to the pivoted frame which is carried by the skeleton frame I am enabled to make short turns, and by having the plowshare adjustable independently of the plow-frame I am enabled to maintain the plow in the proper level position at all times. Furthermore, by having the plowshare adjustable from the forward end of the standard a quick and easy adjustment is obtained. A plow constructed as herein shown and described will be exceedingly strong, durable, light, and efficient and will accomplish all of the objects herein mentioned.

Having thus fully described my invention, what I claim as new, and desire to secure by Letters Patent, is—

1. The combination with the pivoted frame, of the plow-frame connected thereto, extending rearwardly therefrom, said plow-frame members being united at their rear ends and supported by a caster-roller, of a plow-beam pivotally supported at its forward end within the pivoted frame and having a plowshare connected to its lower and rear ends, and means connected to said plow for the purpose of adjusting the same together with means for supporting the pivoted frame.

2. The combination with the pivoted frame, of the plow-frame connected thereto, said plow-frame members being connected at their rear ends and supported by a caster-roller, the plow-beam having its forward end pivotally supported within the pivoted frame, means connected to the said forward end for the purpose of raising and lowering the same, a plowshare arranged upon the rear end of the beam, and means carried by the plow-frame members adjacent to their rear ends for the purpose of raising and lowering the said plowshare and also for the purpose of supporting the same, as specified.

3. The combination with a supporting-frame, of a frame pivoted therein, a plow-frame connected to the pivoted frame, said plow-frame members being connected at their rear ends and supported by a caster-roller, the plow-beam arranged between the members of the plow-frame, the forward end of said beam being connected pivotally to the pivoted frame, means connected to one of the plow-frame members for raising and lowering the forward end of the plow-beam, the plowshare carried by the beam, the chain connected thereto, and the winding-shaft carried by the plow-frame for the purpose of winding and unwinding the said chain, for the purpose specified.

4. The combination with the skeleton frame suitably supported, of the pivoted frame carried thereby, a plow-frame rigidly connected to the said pivoted frame, the rear ends of the members of said plow-frame being connected and supported by a caster-roller, the plow-beam arranged between the members of the frame, the forward end of said beam being pivotally connected to the pivoted frame, the hand-lever pivoted to one of the members of the frame, and operatively connected with the forward end of the plow-beam for the purpose of adjusting the same, the plowshare attached to the rear end of the plow-beam, the chain connected to the plowshare, winding chain and lever for operating the same, substantially as specified.

5. The combination with a skeleton frame, of the axles journaled therein and carrying the ground-wheels, means for adjusting each axle with reference to the skeleton frame, the pivoted frame carried by the skeleton frame, a plow-frame connected thereto, the plow-beam pivotally connected at its forward end to the said pivoted frame, the plowshare arranged upon the rear end of the plow-beam, means for raising and lowering the forward end of the plow-beam, and means for raising and lowering the plowshare, as specified.

6. In a plow of the kind described, the combination with the skeleton frame suitably supported, of the pivoted frame arranged in the skeleton frame and having the plow-frame connected thereto, as specified.

7. In a plow of the kind described, the combination of the skeleton frame suitably supported, of the pivoted frame arranged therein, and the plow-beam pivotally and adjustably connected at its forward end to the said pivoted frame, as specified.

8. In a plow of the kind described, the combination with the pivoted frame, of the plow-frame rigidly connected thereto, the plow-beam, the links connecting the forward ends of the beam to the pivoted frame, one of said links having an arm, the hand-lever pivoted to one of the frame members, and the link-rod connecting the said lever and arm for the purpose of adjusting the forward end of the plow-beam, as specified.

9. In a plow of the kind described, the skeleton frame, comprising the upper and lower sections, the lateral extensions and the inner and outer perforated plates, of the axles journaled between the lateral extensions and in said perforated plates, and means for adjusting the said axles, substantially as described.

10. The combination with the skeleton frame suitably supported and capable of adjustment, of the pivoted frame carried thereby, the plow-frame members rigidly connected to the pivoted frame, connected at their rear ends and supported by a caster-roller, a colter adjustably supported upon one of the plow-frame members, plow-beam arranged between the members of the frame and having its forward end pivotally and adjustably connected to the pivoted frame, the plowshare arranged upon the rear end of the plow-beam, the supporting-chain, and means carried by the plow-frame members adjacent to their rear end for operating the said chain, substantially as specified.

CHARLES T. ELLISTON.

Witnesses:
CHAS. E. BROCK,
CLARENCE SHAW.